(12) United States Patent
Hock (10) Patent No.: US 8,240,643 B2
(45) Date of Patent: Aug. 14, 2012

(54) PNEUMATIC SUSPENSION BELLOWS (75) Inventor: Helmut Hock, Bessenbach (DE)

(73) Assignee: SAF-Holland GmbH, Bessenbach (DE)

( * ) Notice: Subject to any disclaimer, the term of this patent is extended or adjusted under 35 U.S.C. 154(b) by 716 days.

(21) Appl. No.: 11/993,983

(22) PCT Filed: Sep. 1, 2006

(86) PCT No.: PCT/EP2006/008573
§ 371 (c)(1),
(2), (4) Date: Dec. 27, 2007

(87) PCT Pub. No.: WO2007/025771
PCT Pub. Date: Mar. 8, 2007

(65) Prior Publication Data
US 2008/0197547 A1 Aug. 21, 2008

(30) Foreign Application Priority Data
Sep. 2, 2005 (DE) .......................... 10 2005 041 800

(51) Int. Cl.
*F16F 9/04* (2006.01)
*F16F 5/00* (2006.01)
(52) U.S. Cl. .................................. 267/64.27; 267/64.11
(58) Field of Classification Search ............... 267/64.11, 267/64.27; 138/26, 30
See application file for complete search history.

(56) References Cited

U.S. PATENT DOCUMENTS

| | | | |
|---|---|---|---|
| 2,208,540 A | 7/1940 | Brown | |
| 3,897,942 A * | 8/1975 | McNamee | ..................... 267/122 |
| 5,580,033 A * | 12/1996 | Burkley et al. | ............ 267/64.27 |
| 6,264,178 B1 * | 7/2001 | Schisler et al. | ............ 267/64.27 |
| 6,682,058 B1 * | 1/2004 | Nemeth et al. | ............. 267/64.27 |
| 2005/0280193 A1 | 12/2005 | Stoter et al. | |

FOREIGN PATENT DOCUMENTS

| | | |
|---|---|---|
| DE | 2 030 342 | 1/1971 |
| DE | 42 03 372 C1 | 3/1993 |
| DE | 696 16 415 T2 | 11/1996 |
| DE | 197 20 776 A1 | 11/1998 |
| DE | 201 01 576 U1 | 7/2002 |
| DE | 102 16 750 A1 | 10/2003 |
| EP | 0 062 112 A2 | 10/1982 |
| EP | 0 742 113 A1 | 11/1996 |
| EP | 1 058 026 A2 | 12/2000 |
| GB | 1 286 752 | 8/1972 |
| GB | 2 345 477 A | 7/2000 |
| WO | WO 00/41903 A1 | 7/2000 |

* cited by examiner

*Primary Examiner* — Bradley King
*Assistant Examiner* — Vishal Sahni
(74) *Attorney, Agent, or Firm* — Price Heneveld LLP (57) ABSTRACT

The invention relates to a combined pneumatic bellow (14) for a pneumatic suspension (10), wherein an axle-sided area (18) of pneumatic bellow (14) comprises, in a base state, a preshaped adapted from 928) and said adapted form (28) is embodied in such a manner that the axle-sided area (18) can be arranged on a protruding part (30) of a plunger 914) and the axle-sided area (18) is configured in such a manner that, in the event of the axle-sided area 918) moving towards a frame-sided area (16) of the pneumatic bellow (14), the axle-sided area (18) adapts to the adapted form (28). The invention also relates to a pneumatic suspension, a vehicle axle system wherein the inventive pneumatic bellow is used and to a method for producing said pneumatic bellow.

19 Claims, 5 Drawing Sheets

PNEUMATIC SUSPENSION BELLOWS

BACKGROUND OF THE INVENTION

The present invention relates to a pneumatic bellows for a pneumatic suspension/spring, a pneumatic suspension/spring, a vehicle axle system and a method for manufacturing a pneumatic bellows.

Traditionally, an automotive axle of a commercial vehicle has an axle body that forms an axle unit at one end by means of at least one longitudinal swinging arm and is therefore movably coupled to the vehicle frame and is supported with respect to the vehicle frame by a pneumatic suspension arranged above or behind the area of intersection of the axle body and the longitudinal swinging arm. The pneumatic suspension in turn comprises a pneumatic bellows arranged between a cover and a base plate, whereby a plunger is arranged on the pneumatic bellows for mechanical coupling between the pneumatic bellows on the one hand and the axle unit on the other hand. The pneumatic bellows is connected on its axle-sided area to the plunger, with the outside surface of the plunger serving as a rolling surface for the pneumatic bellows, thereby ensuring a guided movement of the pneumatic bellows during operation in the up-and-down movement of the plunger.

However, such pneumatic suspensions have only limited suitability for crane and rail freight loading because the pneumatic bellows is completely rolled out without any additional holding devices due to the weight of the axle, which is then hanging beneath the vehicle, thereby creating a vacuum with respect to the environment in the pneumatic bellow. When the vehicle is lowered, there is the risk that the pneumatic bellows might collapse inward and/or be tilted and/or collapse toward the plunger and therefore unable to roll over the plunger, which can result in damage.

To overcome this problem, the spring path of the pneumatic suspension in crane and rail freight loading is therefore traditionally limited on the basis of a tensioning device and/or safety device attached to the vehicle frame and/or a divided plunger is used. Alternatively, the pneumatic suspension may also be designed so that the pneumatic suspension is detachably connected to the frame. In crane loading of a trailer by means of a readjusting device, the pneumatic suspension is separated from the frame, and the cover and therefore also the suspension bellows are held in a defined position with respect to the plunger by means of the readjusting device so that the suspension bellows will roll over the plunger and/or be held in an unreeled state.

SUMMARY OF THE INVENTION

The object of the present invention is to provide a pneumatic suspension suitable for crane loading of vehicles in a simple manner.

According to the present invention, a pneumatic bellows is made available for a pneumatic suspension, whereby
- an axle-sided area of the pneumatic bellows has a preformed adapted shape in a basic state,
- the adapted shape is designed so that the axle-sided area can be arranged on a protrusion on a plunger,
- the axle-sided area is designed so that with movement of the axle-sided area toward a frame-sided area of the pneumatic bellows, the axle-sided area assumes the adapted shape.

The axle sided area preferably always assumes essentially the adapted shape with a movement toward the frame-sided area of the pneumatic bellows.

The basic state of the pneumatic bellows in the sense of the present invention is a state in which no external outside forces such as tensile forces, thrust and/or shearing forces act on the pneumatic bellows. In particular, the basic state of the pneumatic bellows is the state of the pneumatic bellows when the pneumatic bellows installed in a pneumatic suspension is inflated once by means of compressed air, for example, and then the compressed air is released from the pneumatic suspension, i.e., ambient pressure again prevails in the interior of the pneumatic suspension. In the basic state, no additional force is applied to the pneumatic suspension after inflation, apart from its own weight.

The pneumatic bellows may also have an operating state. The operating state is when, for example, the pneumatic suspension is arranged in the traditional manner, wherein the internal pressure in the pneumatic bellows differs from ambient pressure, for example. This operating state occurs, for example, when the vehicle is being used in the traditional manner. The operating state may also be a state in which the pneumatic suspension is parked for a lengthy period of time. In this case, ambient pressure prevails in the interior of the pneumatic bellows as in the basic state, but a force, namely a portion of the weight of the frame, possibly including the load, has been applied briefly. In the operating state of the pneumatic bellows, the length of the pneumatic suspension is usually less that the length of the pneumatic suspension in the basic state of the pneumatic bellows.

In addition, the pneumatic bellows may have a load state, said load state occurring when the vehicle is loaded by crane onto a freight car, for example, i.e., the axle unit is suspended from the pneumatic suspension. In the loading state of the pneumatic bellows, the pneumatic suspension is usually longer than in the basic state of the pneumatic bellows, as measured along the midline of the suspension.

If the pneumatic suspension is acted upon with a very high internal pressure in the operating state of the pneumatic bellows, it is possible for the pneumatic suspension to have the same dimensions as in the loading state of the pneumatic bellows.

The pneumatic bellows may also be in its basic state when it is uncoupled from the plunger, for example, i.e., the pneumatic bellows is supported alone, for example.

If a trailer on which a pneumatic suspension is provided is loaded onto a freight car, a ferry or the like, the pneumatic bellows is essentially extended completely due to the weight of the axle when the trailer is hoisted via the chassis, i.e., the frame. When the trailer is set down on the freight car and/or the ferry, the pneumatic bellows is designed in particular to resume the state prevailing prior to hoisting. This state may be the basic state, for example, especially if the pneumatic bellows is collapsed, and/or it may be a state deviating from the basic state if the pneumatic bellows is acted upon by an internal pressure, for example.

The adapted shape of the axle-side area is preferably designed so that the pneumatic bellows always rolls over the plunger in a movement of the axle-sided area toward the frame-sided area.

In other words, the pneumatic bellows may essentially be extended fully in hoisting a trailer while it is being loaded onto a freight car and/or ferry. If the trailer is set down on the freight car and/or ferry, the pneumatic bellows rolls over the plunger although a low internal pressure prevails in the pneumatic bellows. Tilting and/or collapsing of the pneumatic bellows is/are prevented by the adapted shape of the pneumatic bellows. In particular the pneumatic bellows again rolls over the plunger even if the pneumatic bellows has collapsed inward due to the low internal pressure. Therefore, it is advantageously not necessary according to the present invention to limit the maximal rebound clearance in loading, e.g., on the basis of an arrester cable as the preferred gripping device and/or tensioning device. In particular, it is also advantageously not necessary to design the plunger to be divided. Instead, the problems of the state of the art are solved easily with the inventive pneumatic bellows.

The present invention advantageously ensures that due to the shape memory of the axle-sided area of this pneumatic bellows, the pneumatic bellows rolls over an outside circumference of the plunger, i.e., the pneumatic bellows is in contact with an outside circumference of the plunger. Shape memory in the sense of the present invention means that the axle-sided area of the pneumatic bellows is always attempting to first assume the adapted shape in a movement of the axle-sided area of the pneumatic bellows toward the frame-sided area of the pneumatic bellows.

The adapted shape is preferably designed so that after essentially complete extension of the pneumatic bellows in a movement of the axle-sided area toward the frame-sided area, the axle-sided area will have the adapted shape.

In other words, the pneumatic bellows may be essentially completely extended and/or stretched. Owing to the shape memory of the axle-sided area of the pneumatic bellows, however, the axle-sided area essentially assumes the adapted shape when there is a load on the pneumatic suspension from the outside, and the pneumatic bellows will roll along the plunger even when a relative vacuum prevails in the interior. Tilting and/or unwanted collapse of the pneumatic bellows is therefore advantageously prevented.

Due to the essentially complete extension of the pneumatic bellows, i.e., when the pneumatic suspension has essentially reached its possible length, it is also possible that the adapted shape is no longer present on the axle-sided area in the essentially completely extended state. However, when the pneumatic suspension is under load, i.e., when the length of the pneumatic suspension is reduced, the axle-sided area first resumes the adapted shape owing to the shape memory of the axle-sided area and the pneumatic bellows therefore then rolls over the outside of the plunger.

The adapted shape is especially preferably designed to extend essentially around one end of the protrusion of the plunger.

The axle-sided area of the pneumatic bellows is therefore essentially completely in contact with the protrusion; the axle-sided area of the pneumatic bellows is in contact with at least a tip and/or an end of the protrusion and preferably also in contact at least slightly with the surfaces surrounding the tip and/or end and/or free end area of the protrusion. In other words, the adapted shape of the axle-sided area of the pneumatic bellows is in contact with the inside of the plunger in at least some areas, preferably surrounding the tip and/or end of the protrusion, and is also in contact with the outside of the plunger is some areas. The outside of the plunger here is the side of the plunger that faces away from a longitudinal axis of the plunger, i.e., is essentially in contact with the environment. The inside of the plunger is a side that faces toward the longitudinal axis of the plunger.

If the pneumatic bellows is completely extended in loading, for example, it is possible for the adapted shape to no longer extend around the protrusion but instead to be arranged only in at least some areas on the inside of the plunger. The axle-sided area of the pneumatic bellows, which has the adapted shape in the basic state, may be spaced a distance away from the protrusion on the plunger already before the end and/or the tip of the protrusion, for example. However, if the frame-sided area of the pneumatic bellows is forced and/or moved toward the axle-sided area of the pneumatic bellows, then because of the shape memory, the adapted shape of the axle-sided area of the pneumatic bellows is re-established again first, and then the axle-sided area essentially extends around the protrusion on the plunger according to its adapted shape. Next, with a further movement of the axle-sided area toward the frame-sided area, the pneumatic bellows rolls along the plunger.

The adapted shape of the axle-sided area of the pneumatic bellows extends in particular along the inside of the protrusion on the plunger as well as at least partially along the outside of the plunger. Thus, in its adapted shape, the axle-sided area of the pneumatic bellows is adapted to the protrusion on the plunger, with the axle-sided area being in contact with the inside of the plunger according to the adapted shape and extending toward the end of the protrusion on the plunger as well as extending toward an axle-sided bearing of the pneumatic suspension on the outside of the plunger. The axle-sided bearing of the pneumatic suspension may be positioned differently with different trailers. The axle-sided bearing may be a plunger mount or a pneumatic suspension carrier. The pneumatic suspension carrier may be arranged on a swinging arm of the axle unit, for example. The axle-sided area of the pneumatic bellows in the sense of the present patent application is the end area of the pneumatic bellows which is connected to the axle-sided bearing of the pneumatic suspension, i.e., the area of the pneumatic suspension that is arranged on the plunger, by means of the plunger and optionally other positioning means. The frame-sided area of the pneumatic bellows is the area of the pneumatic bellows which is connected to the frame by means of a cover and optionally other arranging means.

With this movement of the frame-sided area of the pneumatic bellows toward the axle-sided area of the pneumatic bellows, the pneumatic bellows rolls toward the axle on the outside circumference of the plunger.

Consequently, the cross section of the pneumatic bellows, expressed mathematically, has a minimum. This minimum occurs on the axle side of a maximum of the adapted shape of the axle-sided area—with the movement of the frame-sided area of the pneumatic bellows toward the axle-sided area of the pneumatic bellows—and the minimum is moved toward the axle with this movement. Likewise, the protrusion on the plunger has a maximum and the adapted shape of the axle-sided area of the pneumatic bellows is in contact with the protrusion on the plunger on both the inside and outside of this maximum.

The axle-sided area is preferably essentially S-shaped in cross section. The S-shaped cross section is formed here from the maximum of the adapted shape and the minimum of the pneumatic bellows.

In addition, the axle-sided area preferably has a greater wall thickness than the remaining pneumatic bellows. In particular, the adapted shape has a greater wall thickness than the remaining pneumatic bellows.

The pneumatic bellows is preferably designed in multiple layers. The axle-sided area is especially preferably reinforced with fabric layers, e.g., metal cloth and/or plastic and/or textile fabric layers, preferably at least in the area of the adapted shape, whereby the fabric layers may also extend beyond the area of the adapted shape. In particular, additional fabric layers may also be arranged in the area of the adapted shape.

The pneumatic bellows is especially reinforced with fabric layers and/or reinforcing layers in at least some areas to increase the radial stiffness of the pneumatic bellows. These fabric layers are preferably arranged in the so-called central area of the pneumatic bellows at a distance from the axle-sided area.

These fabric layers are in particular closed cylinder segments which are embedded in the pneumatic bellows and have a height approximately 1 cm up to the extent of the central area, preferably from approximately 3 cm to approximately 8 cm, especially preferably approximately 5 cm.

The pneumatic bellows is preferably made of a restorable material. The pneumatic bellows is in particular made of a material having shape memory in the axle-sided area, so that the shape is resumed again after essentially complete extension of the pneumatic bellows and subsequent compression of the pneumatic bellows.

The pneumatic bellows is especially preferably made of rubber of an elastomer material having comparable material properties.

The axle-sided area especially preferably has an area that is designed so that the pneumatic bellows can be attached to the plunger by clamping an element.

A ring of a metal is preferably incorporated into the axle-sided area. The ring made of metal is in particular incorporated into the pneumatic bellows on the axle-sided end of the pneumatic bellows.

An additional aspect of the present invention comprises a pneumatic suspension having a plunger and inventive pneumatic bellows.

The plunger on the pneumatic suspension is preferably designed in one piece.

Another aspect of the present invention comprises an automotive axle system having a rigid axle body, at least one inventive pneumatic suspension being arranged on the axle body.

According to another aspect of the present invention, a method is provided for manufacturing pneumatic bellows in the following steps:
  prefabricating the pneumatic bellows,
  shaping the axle-sided area of the pneumatic bellows according to an adapted shape and
  final fabrication of the pneumatic bellows.

These and other advantages of the invention will be further understood and appreciated by those skilled in the art by reference to the following written specification, claims and appended drawings.

Figure 1:
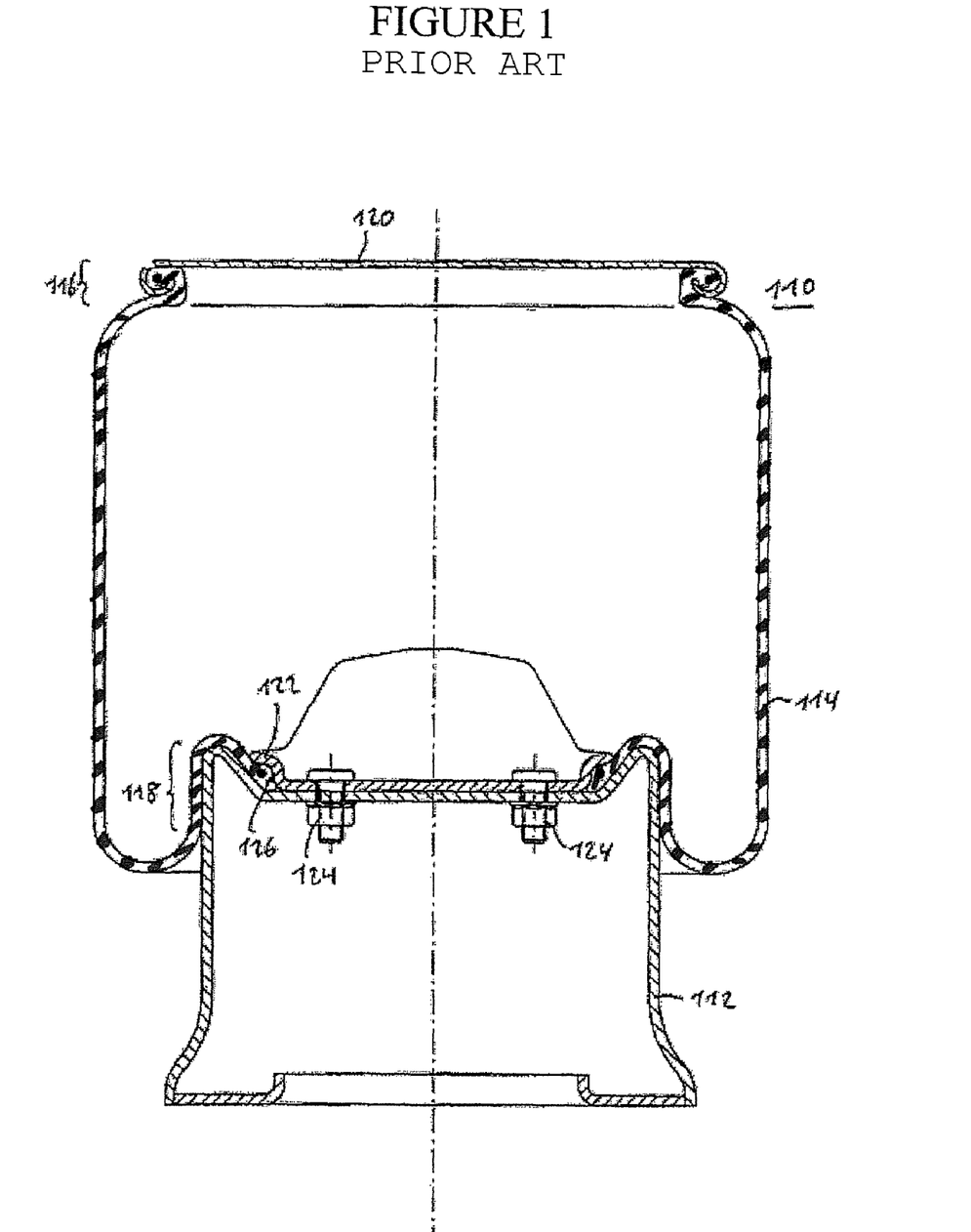
FIG. 1 shows a schematic, cross-sectional, elevational side view of the pneumatic suspension such as that known from the state of the art.

FIG. 1 shows a pneumatic suspension/spring 110 such as that known from state of the art. The pneumatic suspension 110 comprises a plunger 112 and pneumatic bellows 114. The pneumatic suspension has a frame-sided section, i.e., section 116, and an axle-sided section, i.e., area 118 with a middle area 117 arranged between the former. This may also be referred to as a central area. The frame-sided section 116 is closed by a cover 120. The cover 120 may be connected to the frame of a trailer (not shown), for example.

The axle-sided section 118 is connected by a clamping device 122 to the plunger 112. The clamping device 122 is preferably connected, preferably by screw connection, to the plunger 112 by connecting means 124, in particular screws and nuts 124. There is in particular an end area 126 of the axle-sided area 118 of the pneumatic bellows 114 between the clamping device 122 and the plunger 112, so that the end area 126 of the pneumatic bellows 114 is clamped between the clamping device 122 and the plunger 112. This ensures a tight but releasable connection between the pneumatic bellows 114 and the plunger 112.

The plunger 112 is a traditional plunger such as that used in traditional pneumatic suspensions 110. The pneumatic bellows 114 is also a traditional pneumatic bellows such as that used in traditional pneumatic suspensions 110, whereby the pneumatic bellows 114 may be easily removed from the plunger 112, e.g., by at least partially releasing the screws and nuts 124 and moving the clamping device 112 a distance away from the plunger 112. Consequently, the end area 126 of the pneumatic bellows 114 is no longer clamped between the clamping device 122 and the plunger 112 and the one pneumatic bellows 114 may be removed and replaced by a new pneumatic bellows 114, in particular.

Figure 2:
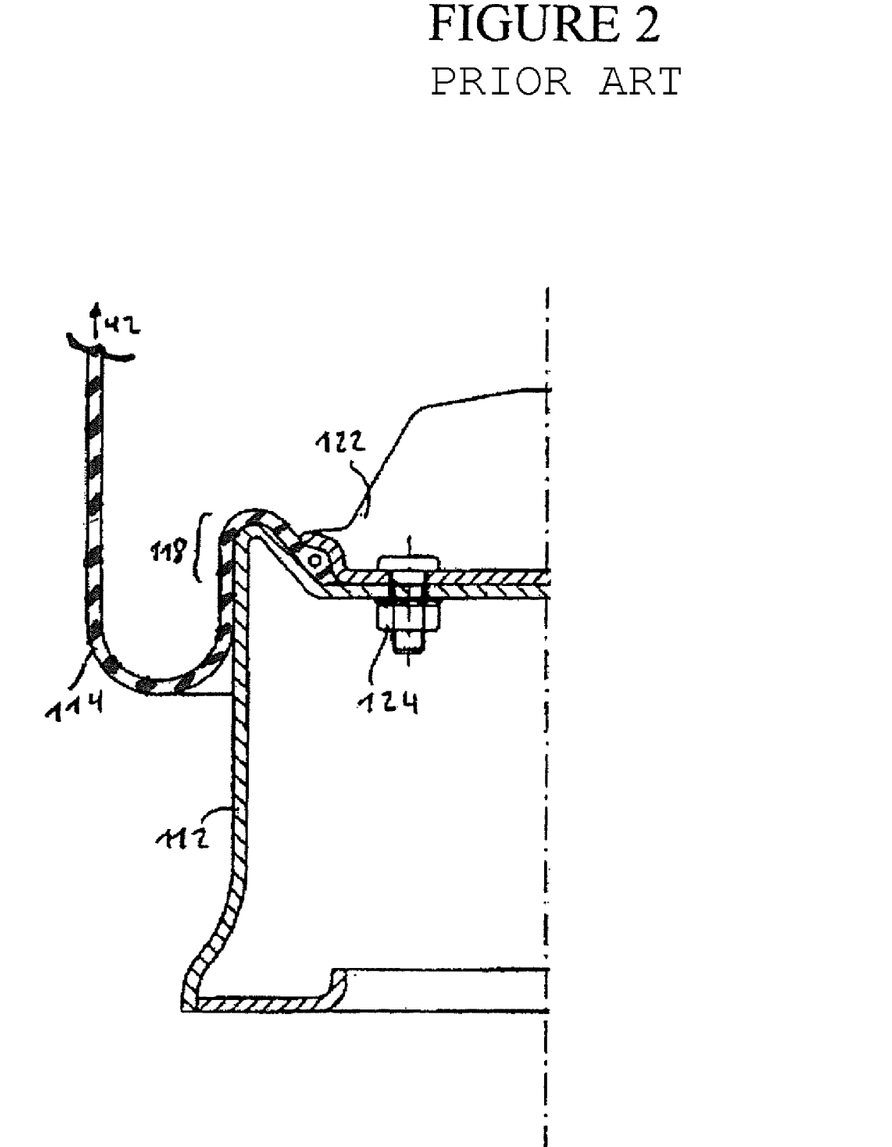
FIG. 2 shows a schematic, partial, cross-sectional, elevational side view of the pneumatic suspension known from the state of the art.
Figure 4:
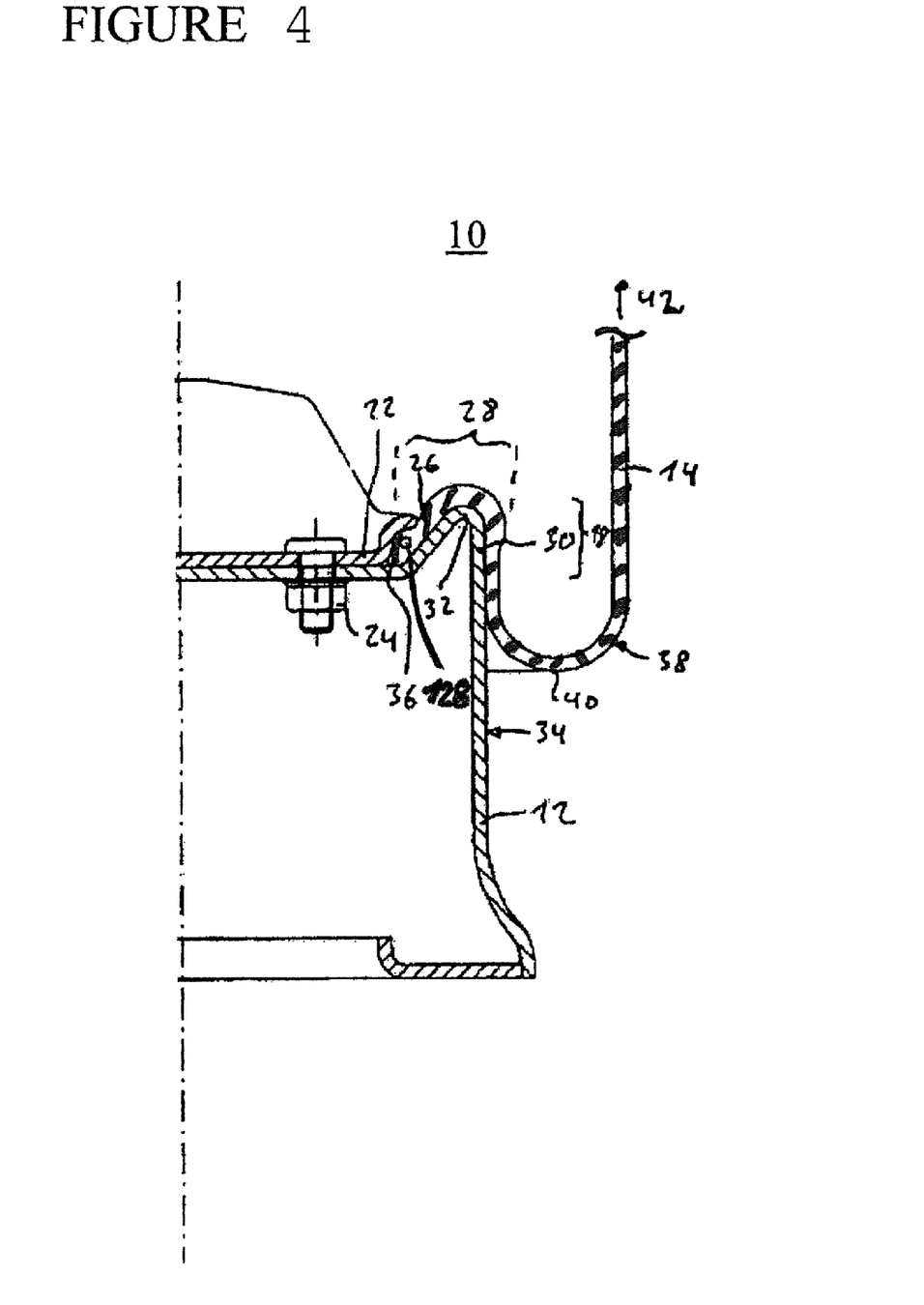
FIG. 4 shows a schematic, partial, cross-sectional, elevational side view of a pneumatic suspension embodying the present invention.

FIG. 4 shows a schematic sectional view of a partial area of a pneumatic suspension/spring 10, whereby FIG. 2 the right half of the pneumatic suspension 10 is designed according to a preferred embodiment of the present invention, while FIG. 2 corresponds to a traditional pneumatic suspension. Accordingly, the reference numerals used on in FIG. 2 are identical to the reference numerals used in FIG. 1.

The pneumatic suspension 10 comprises a plunger 12 on which pneumatic bellows 14 is arranged. Pneumatic bellows 14 has a frame-sided area, i.e., section 16 (shown in FIG. 5) and an axle-sided area, i.e., section 18. The frame-sided area 16 of the pneumatic bellows 14 is also closed by a cover 20 (shown in FIG. 5) and connected by a clamping device 22 by connecting means 24, e.g., screws and nuts 24. An end area 26 of the pneumatic bellows 14 is clamped between the clamping device 22 and the plunger 12, thus ensuring a secure connection of the pneumatic bellows 14 to the plunger 12.

The axle-sided area 18 of the pneumatic bellows 14 also has an adapted shape 28. The adapted shape 28 of the axle-sided area 18 is designed so that the axle-sided area 18 is essentially in contact with a protrusion 30 on the plunger 12. In other words, the material of the axle-sided area 18 of the pneumatic bellows 14 essentially has complete shape memory, i.e., the axle-sided area 18 is manufactured with a predetermined shape, namely the adapted shape 28, whereby the axle-sided area 18 may deviate from the adapted shape due to the application of external forces to the pneumatic bellows 14. Because of the shape memory of the adapted shape 28 of the axle-sided area 18, the axle-sided area 18 essentially resumes the adapted shape 28 after the force has been removed, i.e., the axle-sided area 18 is again essentially in contact with the protrusion 30 on the plunger 12.

In addition, FIG. 2 shows a tip 32 of the protrusion 30. If the curve representing the surface 34 of the plunger 12 in the sectional view is described mathematically, the tip 32 of the protrusion 30 corresponds to a peak in this curve. The adapted curve 28 of the axle-sided area 18 is preferably in contact with the plunger at least in an area from a starting point 36 up to the tip 32 of the protrusion 30. As shown in FIG. 2, the adapted shape 28 may also be in contact with the protrusion beyond the tip 32, i.e., the adapted shape 28 is in contact with the surface 34 of the plunger starting from the starting point 36 and beyond the tip 32 of the protrusion 30.

In the state of the pneumatic suspension 10 shown in FIG. 2, the pneumatic bellows 14 is rolled at least partially over the surface 34 of the plunger 12. In other words, the surface 38 of the pneumatic bellows 14 comes in contact with the surface 34 of the plunger 12 in at least some areas. Furthermore, if the section illustrated in FIG. 2 is described mathematically by the surface 38 of the pneumatic bellows 14, then the surface 38 has a minimum 40 in the sectional view. The minimum 40 here is on the axle side of the tip 32 of the protrusion 30 of the plunger 12. If a force is applied to the pneumatic bellows 14 along a direction of pull 42, e.g., by moving the frame-sided area 16 of the pneumatic bellows 14 away from the axle-sided area 18 of the pneumatic bellows 14, the pneumatic bellows 14 rolls over the plunger 12 and the minimum 40 moves along the direction of pull 42 from the axle (not shown) of the trailer (not shown) to the frame (not shown). However, if a force is applied to the pneumatic bellows 14 opposite the direction of pull 42, e.g., by moving the frame-sided area 16 of the pneumatic bellows 14 toward the axle-sided area 18 of the pneumatic bellows 14, the minimum 40 of the pneumatic bellows 14 moves toward the axle of the trailer, whereby the pneumatic bellows 14 rolls over the plunger 12.

In loading a trailer having a pneumatic suspension 10 onto a freight car, for example, a force is applied to the pneumatic bellows 14, e.g., parallel to the direction of pull 42, and the pneumatic bellows 14 is completely extended, i.e., stretched due to the weight of the axle in particular. Therefore, the pneumatic bellows 14 reaches its maximal length in loading the trailer, whereby the axle is preferably held by the pneumatic suspension and therefore the pneumatic bellows 14 is stretched essentially completely. In this case the minimum 40 is located only slightly on the axle side of the tip 32 of the protrusion 30. However, the minimum 40 may also be just as far away from the axle of the trailer as the tip 32 of the protrusion 30. In special cases, the pneumatic bellows 14 may no longer have a minimum with an essentially complete extension. Instead, the axle-sided area 18 of the pneumatic bellows 14 develops without a minimum directly into the remaining area of the pneumatic bellows 14. For example, the axle-sided area 18 may also deviate from the adapted shape 28 due to the restoration ability of the material of the pneumatic bellows 14 and thus the axle-sided area 18 may no longer be in contact with the protrusion 30 on the plunger 12, e.g., in the environment of the tip 32 of the protrusion 30.

On the other hand, it is also possible for the pneumatic bellows 14 not to be stretched uniformly. Consequently, when seen in cross section, one side of the pneumatic bellows 14 is longer than the other side. For example, the axle-sided area 18 of the shorter side of the pneumatic bellows 14 here may have the adapted shape 28 and the axle-sided 18 of the longer side will deviate from the adapted shape.

If the frame of the trailer is again placed on the axle, i.e., the weight of the frame presses the frame-sided area of the pneumatic bellows 14 toward the axle opposite the direction of pull 42, then the axle-sided area 18 of the pneumatic bellows 14 again first assumes the adapted shape 28. When, in addition, the frame-sided area 16 of the pneumatic bellows 14 again moves toward the axle-sided area 18 (or equivalently the axle-sided area 18 moves toward the frame-sided area 16), then the pneumatic bellows 14 roll rolls over the protrusion 30 on the plunger 12 along the surface 34 of the plunger 12. Consequently, the adapted shape 28 of the axle-sided area 18 of the pneumatic bellows 14 ensures that the pneumatic bellows 14 will not collapse, but instead will roll along the plunger 12.

Loading of a trailer here is easily ensured because even when the pneumatic bellows 14 is essentially completely extended, the pneumatic bellows 14 will still roll over the plunger 12 on compression of the pneumatic suspension 10. In particular, collapse of the axle-sided area 18 against the protrusion 30 is prevented and thus rolling of the pneumatic bellows 14 is ensured.

Figure 3:
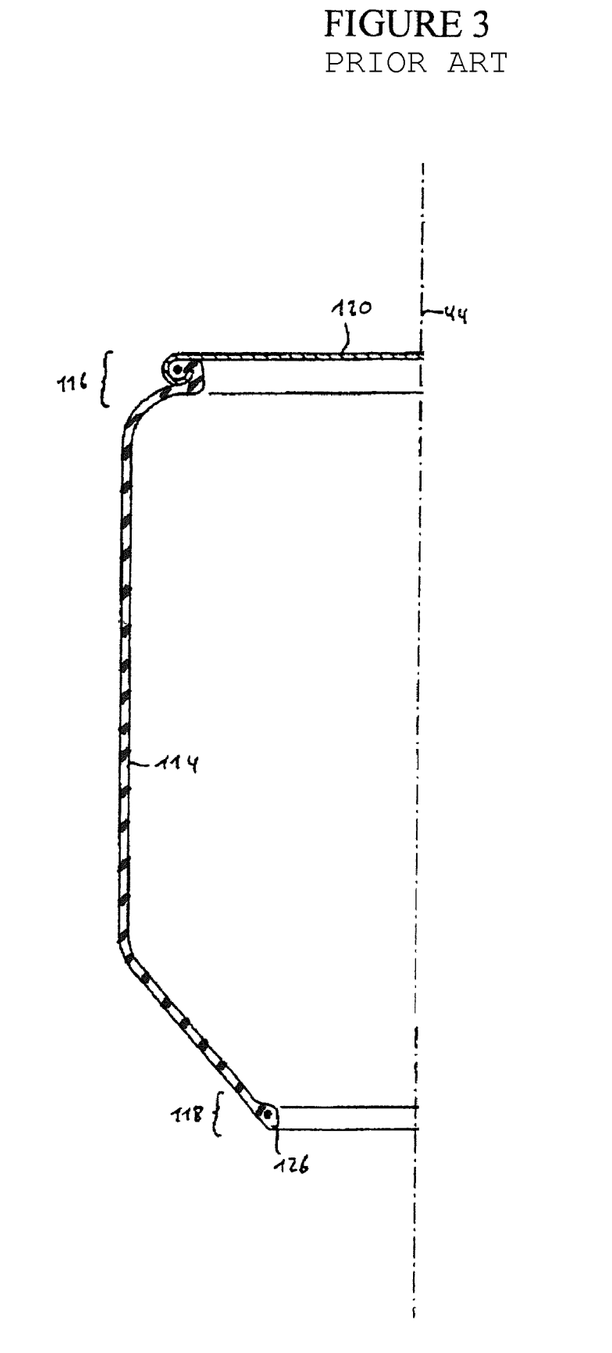
FIG. 3 shows a schematic, partial, cross-sectional, elevational side view of the pneumatic suspension known from the state of the art.
Figure 5:
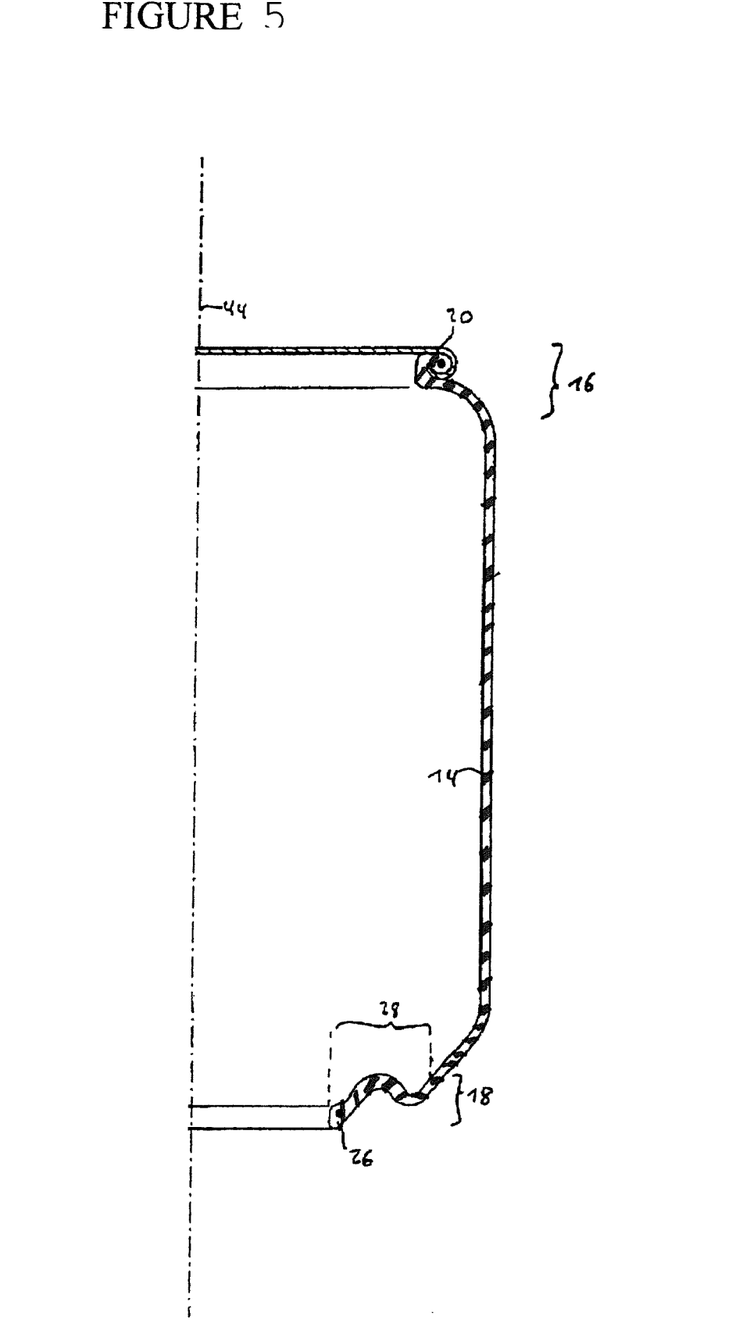
FIG. 5 shows a schematic, partial, cross-sectional, elevational side view of the pneumatic suspension embodying the present invention.

FIG. 3 shows pneumatic bellows 14, 114, whereby the left half shows a traditional embodiment of the pneumatic bellows 114, as in FIG. 2, while FIG. 5 shows the right half of a design of the pneumatic bellows 14 according to a preferred embodiment of the present invention.

The frame-sided area 16 of the pneumatic bellows 14 is closed by the cover 20. The axle-sided area 18 of the pneumatic bellows 14 has the adapted shape 28, whereby the adapted shape 28 is designed so that the axle-sided area 18 of the pneumatic bellows 14 is in contact with the protrusion 30 in at least some areas (shown in FIG. 2). The pneumatic bellows 14 is also shown in FIG. 3 in a basic position, i.e., the basic state of pneumatic bellows 14, i.e., no external tensile or restraining forces, thrust or shearing forces act on the pneumatic bellows 14. The diagram of the pneumatic bellows 14 in FIG. 3 thsu corresponds to the shape assumed by the pneumatic bellows 14 when the pneumatic bellows 14 is not connected to the plunger 12, for example. The pneumatic bellows 14 then assumes the basic position when it is placed and/or supported on a table top or on the ground, for example.

In addition, a length along an axial direction 44 of the pneumatic bellows 14 in its basic position need not correspond to the maximal length of the pneumatic bellows 14. Instead, the maximal length of the pneumatic bellows 14 may be greater than the length of the pneumatic bellows 14 in its basic position, for example if the pneumatic bellows 14 is stretched along the axial direction 44 in loading, for example, whereby in particular the shape of the axle-sided area 18 in the state may deviate from the adapted shape 28 and, for example, the shape of the axle-sided area 18 may be identical to the shape of the axle-sided area 118 of a traditional pneumatic bellows 114. This is the case in particular when a trailer is loaded from the road onto a freight car, for example, and the pneumatic bellows 14 is essentially stretched to the full extent due to the weight of the axle (not shown). When the loading is finished, i.e., the frame (not shown) presses the frame-sided area 16 of the pneumatic bellows 14 toward the axle because of the weight of the frame, the axle-sided area 18 first resumes the adapted shape 28 before the pneumatic bellows 14 rolls further over the protrusion 30 along the surface 34 of the plunger 12. This ensures that the axle-sided area 18 does not collapse and/or become tilted and that the pneumatic bellows 14 will roll over the plunger 12. Thus, according to present invention, a simple means of loading a trailer is achieved without requiring a complex design of the plunger 12. e.g., as a two-part plunger or as a movable plunger.

Additional reinforcement of the pneumatic bellows 14 by introduction of fabric layers 29 running over areas of the pneumatic bellows, preferably radially, are arranged preferably in the central area 17, supporting the desired rolling behavior, in particular in pneumatic bellows 14 having a large outside diameter. The fabric layers may also be in the form of one or more radial outer rings that are spaced a distance apart from one another or may also be arranged so they are in direct contact with one another. The outside rings may also be formed by inserted reinforcing layers and/or fabric layers that are arranged in the material of the pneumatic bellows or are applied to the inside or outside surface of the pneumatic bellows material. Additional reinforcement of the pneumatic bellows 14 may be accomplished via tissue layers.

A ring 128 of a metal is preferably incorporated into the axle-sided area 18. The ring 128 made of metal is in particular incorporated into the pneumatic bellows 14 on the axle-sided end of the pneumatic bellows 14.

However, the reinforcing effect may also be achieved merely through a suitable configuration in the pneumatic bellows material, e.g., in the form of corrugated tubing without necessarily requiring additional reinforcing layers in these areas. To this extent, the material of the pneumatic bellows and/or its wall thickness in the reinforcing areas may be retained or even varied in a targeted manner. It would thus be conceivable as a configuration to design areas that are curved toward the outside and/or toward the inside or have a sinusoidal extent in the cross section of the pneumatic bellows and extend in a ring around the longitudinal axis of the pneumatic suspension—either contacting one another or one developing into the other or spaced a distance apart from one another. Such reinforcing areas may also additionally have the aforementioned reinforcing layers in or on the pneumatic bellows material.

LIST OF REFERENCE NUMERALS

10 Pneumatic suspension/spring
12 Plunger
14 Pneumatic bellows
16 Frame-sided area
17 Central area
18 Axle-sided area
20 Cover
22 Clamping device
24 Connecting means/screws and nuts
26 End area
28 Adapted shape
29 Areas of fabric layers and/or reinforcing area
30 Protrusion
32 Tip of the protrusion
34 Surface of the plunger
36 Starting point
38 Surface of the pneumatic bellows
40 Minimum
42 Direction of pull
44 Longitudinal direction of an axle
110 Pneumatic suspension
112 Plunger
114 Pneumatic bellows
116 Frame-sided area
117 Central area
118 Axle-sided area
120 Cover
122 Clamping device
124 Connecting means/screws and nuts
126 End area

The invention claimed is:

1. A pneumatic bellows for a pneumatic suspension, comprising:
an axle-sided area of the pneumatic bellows has a preshaped adapted shape when in its basic state, such that the axle-sided area is arrangeable on a protrusion of a plunger, wherein a protrusion of a plunger has a given shape and the adapted shape of the axle-sided area is substantially complementary to the given shape of protrusion of the plunger when no external force is exerted on the pneumatic bellows; and
wherein the axle-sided area assumes the adapted shape as the axle-sided area is moved towards a frame-sided area of the pneumatic bellows after essentially complete extension of the pneumatic bellows from a shape that is different than the adapted shape, and wherein the adapted shape of the axle-sided area is designed such that the adapted shape of the pneumatic bellows rolls over the plunger in a movement of the axle-sided area toward the frame-sided area.

2. The pneumatic bellows according to claim 1, wherein the adapted shape is designed so that after essentially complete extension of the pneumatic bellows in a movement of the axle-sided area toward the frame-sided area, the axle-side area assumes the adapted shape.

3. The pneumatic bellows according to claim 1, wherein the adapted shape or bellows is designed so that one end of the protrusion on the plunger extends essentially around one end.

4. The pneumatic bellows according to claim 1, wherein the axle-sided area has an essentially S-shaped cross-section.

5. The pneumatic bellows according to claim 1, wherein the axle-sided area includes a first wall thickness, the pneumatic bellows includes a remaining portion extending upwardly from the axle-sided area and includes a second wall thickness, and wherein the first wall thickness is greater than the second wall thickness.

6. The pneumatic bellows according to claim 1, wherein the pneumatic bellows is designed in multiple layers.

7. The pneumatic bellows according to claim 1, wherein axle-sided area is reinforced with tissue layers.

8. The pneumatic bellows according to claim 1, wherein the pneumatic bellows is reinforced with reinforcing layers in at least some areas that increase that radial stiffness of the pneumatic bellows.

9. The pneumatic bellows according to claim 1, wherein the pneumatic bellows is made of an elastometric material.

10. The pneumatic bellows according to claim 9, wherein the pneumatic bellows is made of rubber.

11. The pneumatic bellows according to claim 1, wherein the axle-sided area has an area that is designed so that the pneumatic bellows is attachable to the plunger by a clamping element.

12. The pneumatic bellows according to claim 1, wherein a ring made of a metal is coupled to the axle-sided area thereby structurally reinforcing the axle-sided area.

13. The pneumatic suspension according to claim 8, wherein the reinforcing layers comprise fabric layers.

14. The pneumatic suspension according to claim 12, wherein the ring is in-molded within the axle-sided area.

15. A pneumatic bellows assembly, comprising:
a pneumatic bellows including a frame-sided area and an opposing axle-sided area having an adapted shape when free of external forces;
a plunger coupled with the pneumatic bellows and including a protrusion having a given shape; and
wherein the adapted shape of the axle-sided area of the pneumatic bellows is substantially similar to the given shape of the protrusion of the plunger, and wherein the adapted shape of the axle-sided area is at least partially spaced from the plunger after essentially complete extension of the pneumatic bellows from a shape that is different than the adapted shape, as the axle-sided area is moved away from the frame-sided area and abuts the given shape of the protrusion as the axle-sided area is moved toward the frame-sided area.

16. The pneumatic bellow assembly according to claim 15, wherein the adapted shape includes an arcuate portion.

17. The pneumatic bellow assembly according to claim 16, wherein the adapted shape comprises an S-shaped cross-section configuration.

18. A pneumatic bellows for a pneumatic suspension, comprising:
- an axle-sided area of the pneumatic bellows has a pre-shaped adapted shape when in its basic state, such that the axle-sided area is arrangeable on a protrusion of a plunger, wherein a protrusion of a plunger has a given upward extending convex shape and the adapted shape of the axle-sided area is substantially complementary to the given shape of protrusion of the plunger when no external force is exerted on the pneumatic bellows; and
- wherein the axle-sided area assumes the adapted shape as the axle-sided area is moved towards a frame-sided area of the pneumatic bellows after essentially complete extension of the pneumatic bellows from a shape that is different than the adapted shape.

19. A pneumatic bellows for a pneumatic suspension, comprising:
- an axle-sided area of the pneumatic bellows has a pre-shaped adapted shape when in its basic state, such that the axle-sided area is arrangeable on a protrusion of a plunger, wherein a protrusion of the plunger has a given shape and the adapted shape of the axle-sided area is substantially complementary to the given shape of protrusion of the plunger when no external force is exerted on the pneumatic bellows; and
- wherein the axle-sided area assumes the adapted shape as the axle-sided area is moved towards a frame-sided area of the pneumatic bellows after essentially complete extension of the pneumatic bellows from a shape that is different than the adapted shape, and wherein the adapted shape of the axle-sided area is at least partially spaced from the plunger as the axle-sided area is moved away from the frame-sided area.

* * * * *

UNITED STATES PATENT AND TRADEMARK OFFICE
CERTIFICATE OF CORRECTION

| | |
|---|---|
| PATENT NO. | : 8,240,643 B2 |
| APPLICATION NO. | : 11/993983 |
| DATED | : August 14, 2012 |
| INVENTOR(S) | : Helmut Hock |

It is certified that error appears in the above-identified patent and that said Letters Patent is hereby corrected as shown below:

Cover page, Abstract
Line 4, "a preshaped adapted from 928)" should be --a preshaped adapted form (28)--;
Line 6, "plunger 914)" should be --plunger (12)--;
Line 8, "axle-sided area 918" should be --axle-sided area (18)--;

Column 1
Line 65, "axle sided" should be --axle-sided--;

Column 2
Line 26, "that" with --than--;
Line 54, "axle-side" should be --axle-sided--;

Column 6
Line 22, "clamping device 112" should be --clamping device 122--;
Line 29, "whereby FIG 2. the right half" should be --whereby the right half--;
Line 33, "used on in FIG. 2" should be --used in FIG. 2--;

Column 7
Line 55, "axle-sided 18" should be --axle-sided area 18--;
Line 65, "roll rolls" should be --rolls--;

Column 8
Line 26, "thsu" should be --thus--;
Line 55, "12." should be --12,--;

Column 10
Line 29-30, "wherein axle-sided" should be --wherein the axle-sided--;
Line 33, (2nd occurrence), "that" should be --the--;
Line 66, "bellow" should be --bellows--;

Signed and Sealed this
Twenty-seventh Day of November, 2012

David J. Kappos
*Director of the United States Patent and Trademark Office*

Column 11
Line 1, "bellow" should be --bellows--.